US011244268B2

(12) United States Patent
Subramanian et al.

(10) Patent No.: US 11,244,268 B2
(45) Date of Patent: Feb. 8, 2022

(54) HARMONIZED MULTI-COLUMN FLEXI USER INTERFACE

(71) Applicant: SAP SE, Walldorf (DE)

(72) Inventors: Krishnan Harihara Subramanian, Bangalore (IN); Dinesh Bhandarkar, Bangalore (IN); Catherine Sneha P, Chennai (IN); Jerin James, Bangalore (IN); Nagashree S, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/736,998

(22) Filed: Jan. 8, 2020

(65) Prior Publication Data
US 2021/0209528 A1 Jul. 8, 2021

(51) Int. Cl.
*G06Q 10/06* (2012.01)
*G06F 16/9032* (2019.01)

(52) U.S. Cl.
CPC ... *G06Q 10/0633* (2013.01); *G06F 16/90328* (2019.01); *G06Q 10/0637* (2013.01)

(58) Field of Classification Search
None
See application file for complete search history.

(56) References Cited

U.S. PATENT DOCUMENTS

| 10,445,335 | B2* | 10/2019 | Kohan | H04L 67/16 |
| 2002/0188486 | A1* | 12/2002 | Gil | G06Q 10/06 |
| | | | | 705/7.12 |
| 2007/0028182 | A1 | 2/2007 | Kong | |
| 2007/0289022 | A1* | 12/2007 | Wittkotter | H04L 63/123 |
| | | | | 726/27 |
| 2011/0099508 | A1 | 4/2011 | Liu | |
| 2012/0317504 | A1 | 12/2012 | Patel et al. | |
| 2013/0073472 | A1* | 3/2013 | Moran | G06Q 30/016 |
| | | | | 705/304 |
| 2015/0120388 | A1* | 4/2015 | Tan | H04W 4/021 |
| | | | | 705/7.32 |

(Continued)

FOREIGN PATENT DOCUMENTS

EP 3438808 A1 2/2019

OTHER PUBLICATIONS

Meier, Horst, et al. "Key performance indicators for assessing the planning and delivery of industrial services." Procedia Cirp 11 (2013): 99-104. (Year: 2013).*

(Continued)

*Primary Examiner* — Thomas L Mansfield
(74) *Attorney, Agent, or Firm* — Buckley, Maschoff & Talwalkar LLC

(57) ABSTRACT

According to some embodiments, systems and methods are provided, comprising providing, via a request module, a user interface, wherein the user interface displays at least one request and a status for each request; receiving selection of one of the displayed requests at a unification layer, via the user interface, wherein the unification layer is provided by the request module; accessing, by the request module, at least one of a first application and a second application based on the received selection; and generating a visualization displayed on the user interface, wherein the visualization includes the at least one request and status for each request, the selected at least one request and a request indicator. Numerous other aspects are provided.

20 Claims, 9 Drawing Sheets

(56) References Cited

U.S. PATENT DOCUMENTS

| | | | |
|---|---|---|---|
| 2017/0235466 A1* | 8/2017 | Tanwir | G06F 9/451 715/738 |
| 2017/0235848 A1* | 8/2017 | Van Dusen | G06F 30/20 705/12 |
| 2017/0329499 A1 | 11/2017 | Rauschenbach et al. | |
| 2018/0121082 A1 | 5/2018 | Zhu et al. | |
| 2019/0065440 A1 | 2/2019 | Lu et al. | |
| 2019/0163821 A1* | 5/2019 | Pal | G06F 16/252 |

OTHER PUBLICATIONS

"Oracle Alta UI", Integrated Cloud Applications & Platform Services, Retrieved from https://www.oracle.com, retrieved date Jan. 2020, 36pgs.

* cited by examiner

HARMONIZED MULTI-COLUMN FLEXI USER INTERFACE

BACKGROUND

Organizations often use products and/or software applications to perform different tasks. At times, execution of the software application may result in errors whereby the software application does not perform the task as intended. In these instances, a user at the organization may contact a service manager to address error. Typically, the service manager may be responsible for addressing more than one error, and the service manager may access multiple software applications to plan the steps to fix the error and to track and confirm that these steps have been executed. The use of multiple software applications is cumbersome and results in increased time for processing as the service manager has to navigate through multiple applications to determine whether information entered in one application is carried through to another application. Additionally, the use of multiple applications may make it difficult for the service manager to get a sense of the totality of the errors for which they are responsible, and for the status of these errors.

Systems and methods are desired which support the efficient use of planning and confirming the resolution of the errors.

BRIEF DESCRIPTION OF THE DRAWINGS

Figure 6:
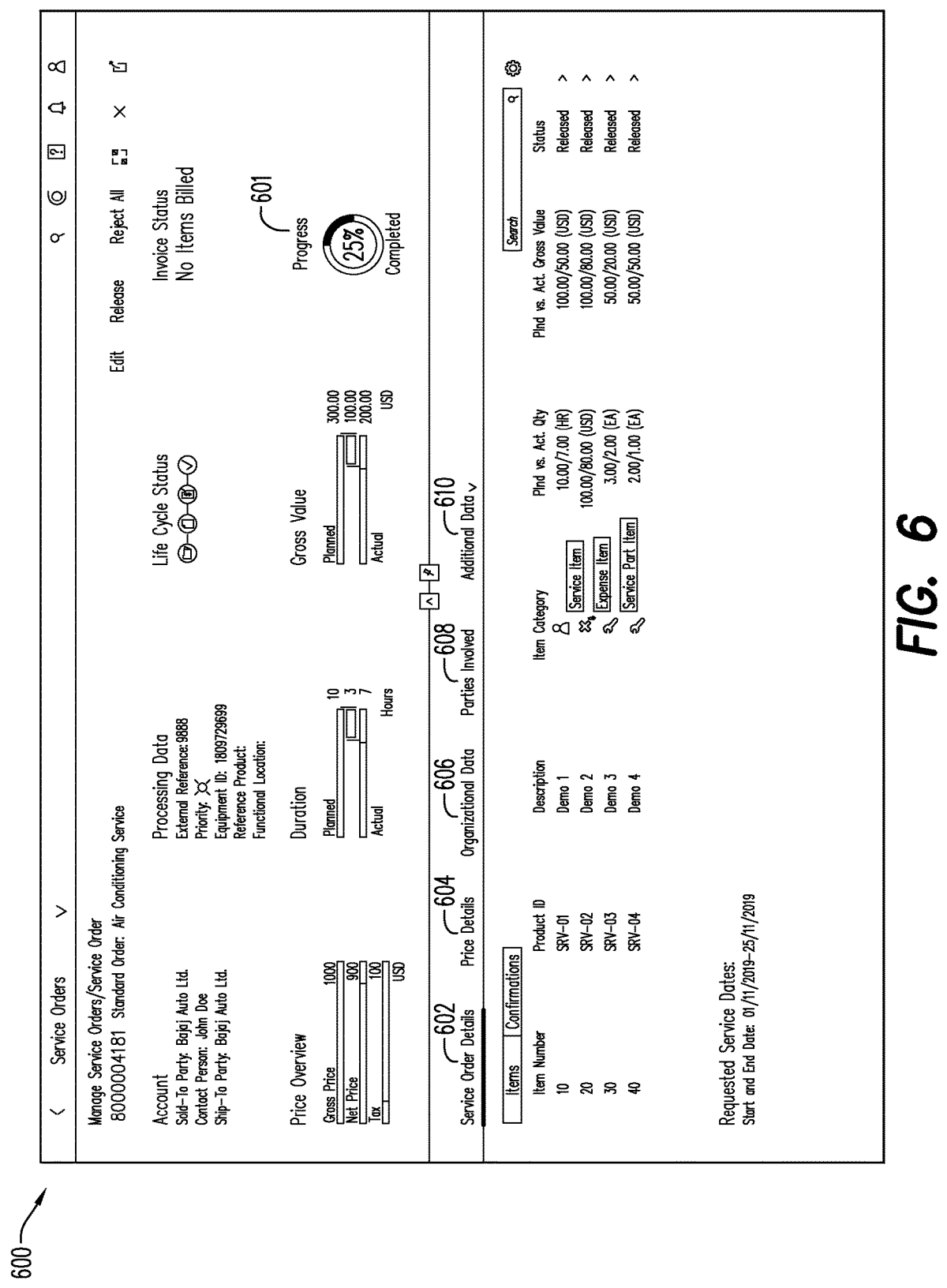

FIG. 6 is an outward view of a graphical interface according to some embodiments.

Figure 7:
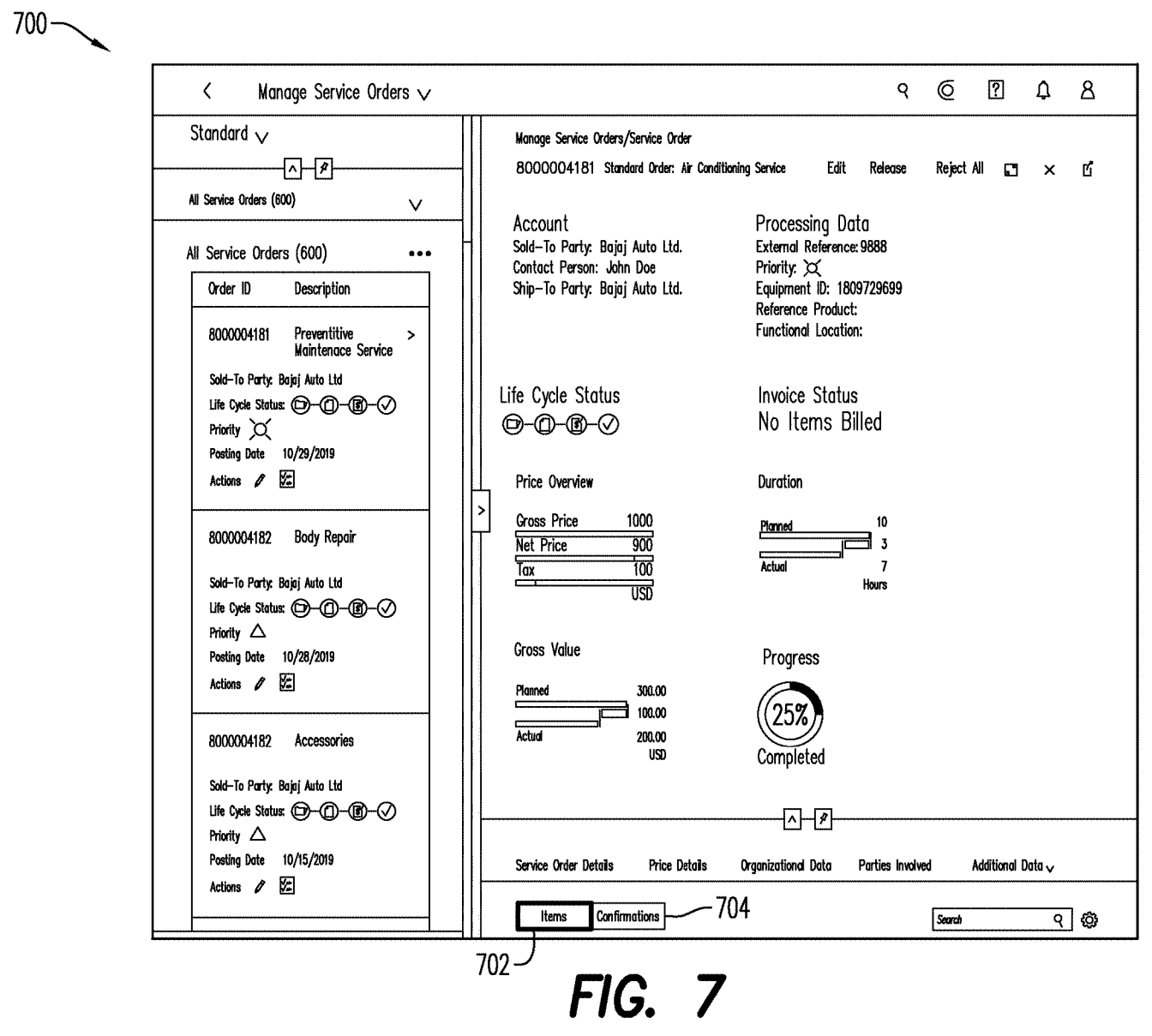

FIG. 7 is an outward view of a graphical interface according to some embodiments.

DETAILED DESCRIPTION

The following description is provided to enable any person in the art to make and use the described embodiments and sets forth the best mode contemplated for carrying out some embodiments. Various modifications, however, will remain readily apparent to those in the art.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) to implement the specific techniques set forth herein.

Figure 1:
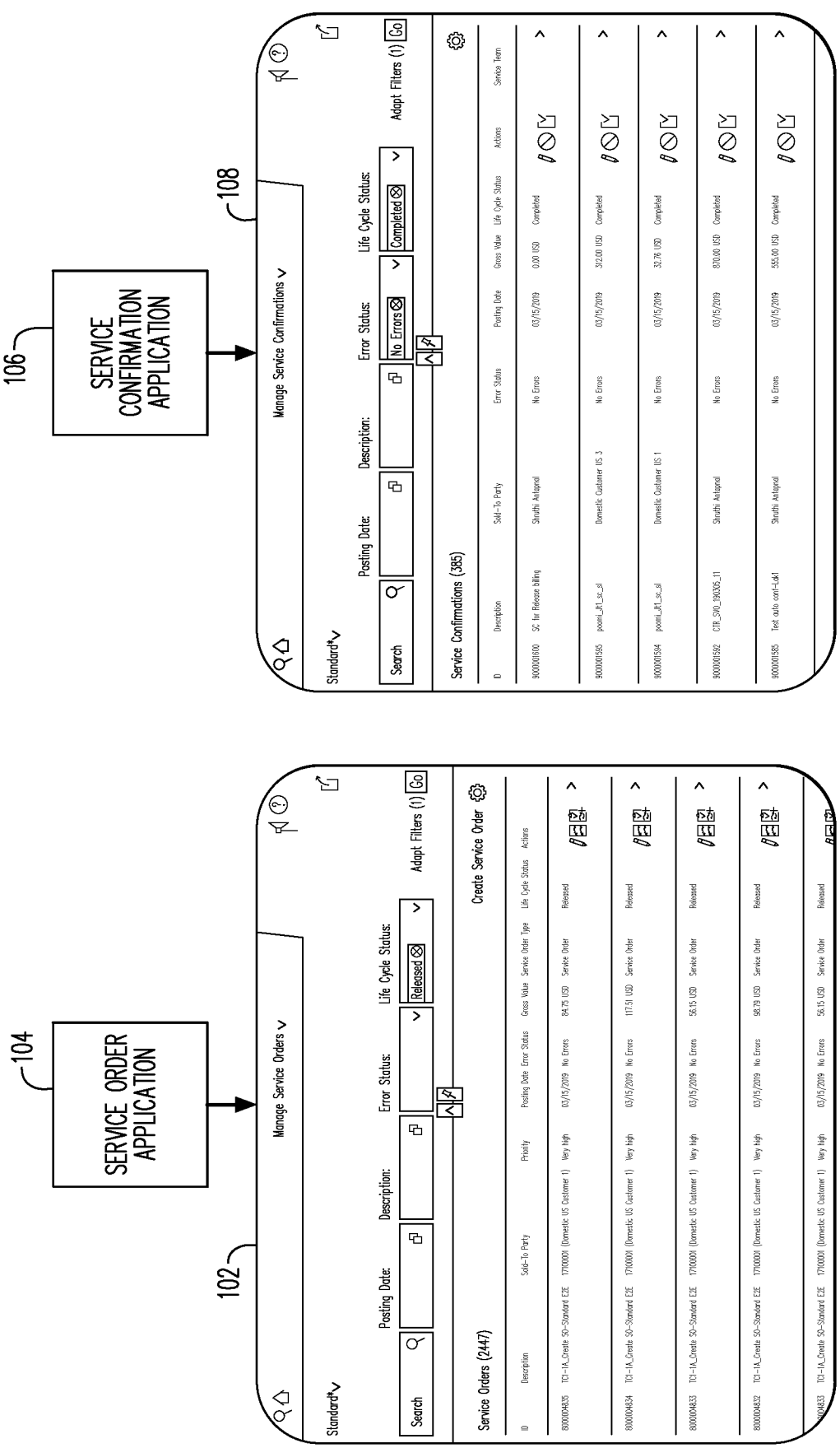
FIG. 1 is an outward view of multiple user interfaces according to the prior art.
Figure 2:
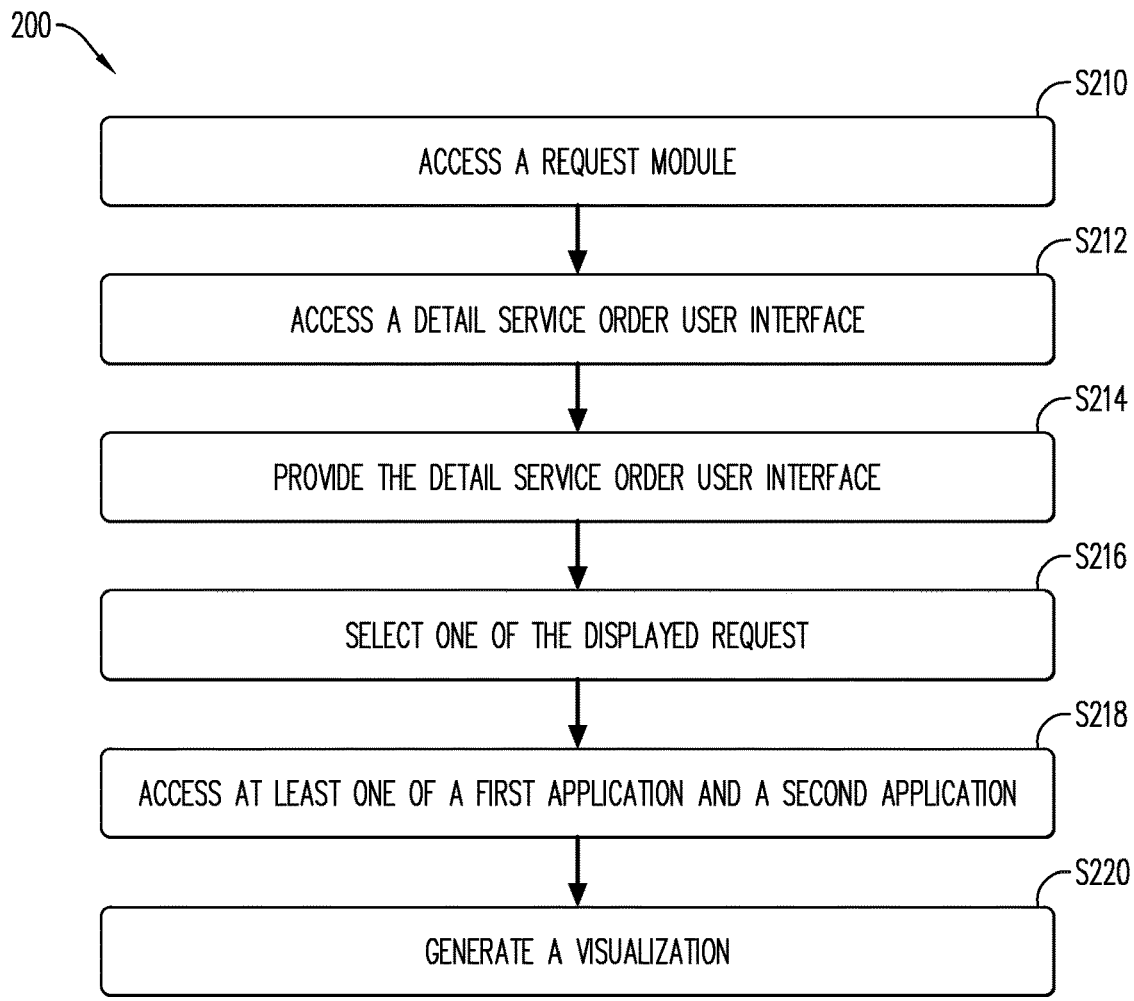
FIG. 2 is a flow diagram of a process according to some embodiments.

When a product is used, such as by an organization, error conditions may occur or there may be another problem with the product. The error condition or problem ("error") may refer to an error, flow, fault or failure in a computer program/application, system or other product that causes the program or product to produce an incorrect or unexpected result or to behave in an unintended way. The error may stem from at least one of system hardware fault, software error, power failure, electrical or mechanical failures, any of which (alone or in combination) may lead to a complete system shutdown scenario. The organization may contact a service provider to resolve the error. A user at the service provider (e.g., service manager) may first use a first software application to create a service order to address the problem. As shown in a non-exhaustive example in FIG. 1, a user interface 102 for a service order application 104 is provided. This service order application 104 may allow the service manager to plan for a technician to correct the error.

After the service manager creates the service order via the service order application 104, they notify a technician of the error and assign the technician the task of resolving the error. The technician may then access a second software application to report the status of the resolution (e.g., whether the error has been resolved, the time it took to resolve, the date on which it was resolved, any follow-up data, etc.). The service manager may then need to access the second software application to determine the progress of the service order. Continuing with the non-exhaustive example shown in FIG. 1, a user interface 108 for the service confirmation application 106 is provided. This service confirmation application 106 may allow the service manager to determine the progress of the service order. The service manager may then have to perform one or more manual calculations to determine any key performance indicators which may indicate the efficiency of the process.

One or more embodiments provide for a unified user interface (UI) layer, via a request module, whereby the unified UI layer accesses both the service order application and the service confirmation application and incorporates both the order and confirmation UIs. The request module may, via the unified UI layer, generate a unified visualization that may provide on a single UI ("unified UI"): all of the action items (e.g., service orders), additional information for a given order (as selected by the user), as well as Key Performance Indicators (KPI), including but not limited to planned cost vs. actual costs, planned hours vs. actual hours and confirmation information. The unified UI may afford the user the ability to know what was planned to address the problem, as well as what was carried out to resolve the problem without having to navigate to different screens. Further, conventionally, for KPI information a user would need to use a separate analysis application, which may need to access the transaction application(s) (e.g., service order application and service confirmation application), or receive direct input from a user, or may need to manually calculate the KPIs based on the information from the different applications. Conventional transactional applications do not provide graphical visualizations, other visualizations and KPI information. Instead, conventionally a user may use an analytical application that combines a large amount of data to provide analysis of the information in aggerate. In one or more embodiments, the request module automatically generates the KPI information and presents it as a visualization on the unified UI for the transaction applications, and may provide the KPI information and visualization on both an aggregate transaction level (e.g., for more than one service order) and on the individual transaction level (e.g., for an individual service order).

FIGS. 2-9 include a flow diagram of a process 200 (FIG. 2) described with respect to an outward view of user interfaces according to some embodiments. Process 200 may be executed by application server 940 according to some embodiments. In one or more embodiments, the application server 940 may be conditioned to perform the process 200, such that a processor 1010 (FIG. 10) of the server 940 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

User interface 300/400/500/600/700/800 may be presented on any type of display apparatus (e.g., desktop monitor, smartphone display, tablet display) provided by any type of device (e.g., desktop system, smartphone, tablet computer). One or more embodiments may include a UI renderer (not shown) which is executed to provide user interfaces 300/400/500/600/700/800 and may comprise a Web Browser, a standalone application, or any other application. Embodiments are not limited to user interface 300/400/500/600/700/800 of FIGS. 3, 4, 5, 6, 7 and 8.

As used herein, the "requestor" or "client" may refer to an individual or organization having an error/problem. The "user" may refer to an individual, (such as a service manager, or organization, such as a service provider), retained by the requestor to resolve the error. The requestor may send the service manager the error in the form of "a request". The service manager may access the request module, in one or more embodiments, to create a request in the transactional system (e.g., service order application and order confirmation application). As used herein, the terms "request" and "service order" may be used interchangeably. The request module, in one or more embodiments, may provide for the service manager to create the request, and track the request from creation, through assignment, resolution and billing.

Figure 3:
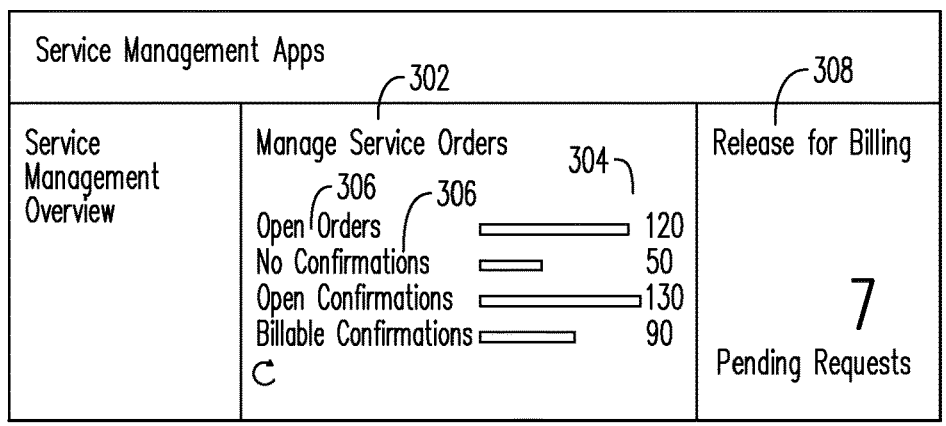
FIG. 3 is an outward view of a graphical interface according to some embodiments.

Initially, at S210, a user (not shown) may log in to the system and accesses, via the unified UI layer, a request module 902 (FIG. 9), which may provide a user interface 300 (FIG. 3) specific for the user. The user interface 300 may be a service management overview for the specific user, as shown in FIG. 3. In one or more embodiments, the request module 902 may receive credentials for the user, as entered by the user during the log-in; and then the request module 902 may access a first application 904 and a second application 906, and generate the service management overview interface 300 based on data received from both the first application 904 and the second application 906. In one or more embodiments, the first application 904 and the second application 906 may trace execution of the service order/request. The first application 904 may be a service order application. The service manager may use the service order application to trace assignment of the request for execution thereof, and in particular to enter the request/service order and plan for a technician to correct the error. The second application 906 may be a service confirmation application. The service confirmation application may trace implementation of the assignment of the request/service order and allow the service manager to determine the progress of the service order. It is noted that while the service order application is referred to as the first application herein and the service confirmation application is referred to as the second application herein, this is to facilitate the description, and either the service order application or the service confirmation application may be the first or second application.

The service management overview interface 300 may provide a service order summary 302, where all of the service orders 304 are aggregated and categorized by a service order status 306. In one or more embodiments, the service order status 306 includes, but is not limited to, "open orders", "no confirmations", "open confirmations" and "billable confirmations". As used herein, "open orders" may refer to orders that have been created, but no technician has been assigned (e.g., all service orders in an open status); "no confirmation" may refer to orders which are released and have no confirmations created yet (e.g., orders which are released (and no errors) and are eligible for confirmation creation but do not have any confirmation created yet); "open confirmations" may refer to an order that has been assigned to a technician but has not been reported as "complete" (e.g., orders which have at least one confirmation that is in "open" status); and "billable confirmations" may refer to orders that have been completed and are ready for billing. It is noted that other order status 306 may include "all service orders", which lists all service orders in the system; and "unassigned orders", which may be used primarily for external interfaces where service orders may get created without employee responsible (as all external systems may not have employee concept or integration), and employees may be reassigned through this tab). As shown in FIG. 3, for this particular user, the service order status 306 of open orders has a total of 120 "open orders"; the service order status 306 of "no confirmations" has a total of 50 service orders with no confirmations; the service order status 306 of "open confirmations" has a total of 130 open confirmation service orders; and the service order status 306 of "billable confirmations" has a total of 90 billable confirmation service orders. In one or more embodiments, the service management overview interface 300 may also include a release for billing section 308. The release for billing section 308 may indicate the number of service orders that have been invoiced to the requestor/client for payment. As shown in the non-exhaustive example in FIG. 3, seven service orders have been released for payment.

In one or more embodiments, the service management overview interface 300 may be an entry point for accessing the individual requests associated with the service manager. Next, at S212, the user may access a detail service order user interface 400 (FIG. 4) by clicking, or otherwise selecting, any place within the service management overview interface 300. In other embodiments, the service management overview interface 300 may include a specific selector for accessing the detail service order user interface 400. Then, in response to the selection, the detail service order user interface 400 is provided in S214. The detail service order user interface 400 displays at least one order/request 404 and a service order status for each request. The detail service order user interface 400 may include data 402 for individual service orders 404. The data 402 for each order may include values for one or more parameters, including but not limited to, an order identification (id), a description, a sold-to-party, life-cycle status, priority and posting date. In one or more embodiments, the detail service order user interface 400 may include one or more actions 403 that may be selected via an action selector 405. When selected, the action selector 405 may allow the service manager to edit the Service Order for detailed level information notes (e.g., via selection of the pencil icon) or release the order/request 404 to the next step (e.g., via selection of the Activity Icon in Fiori where a Service Order is Released to be eligible for Confirmation creation).

Figure 4:
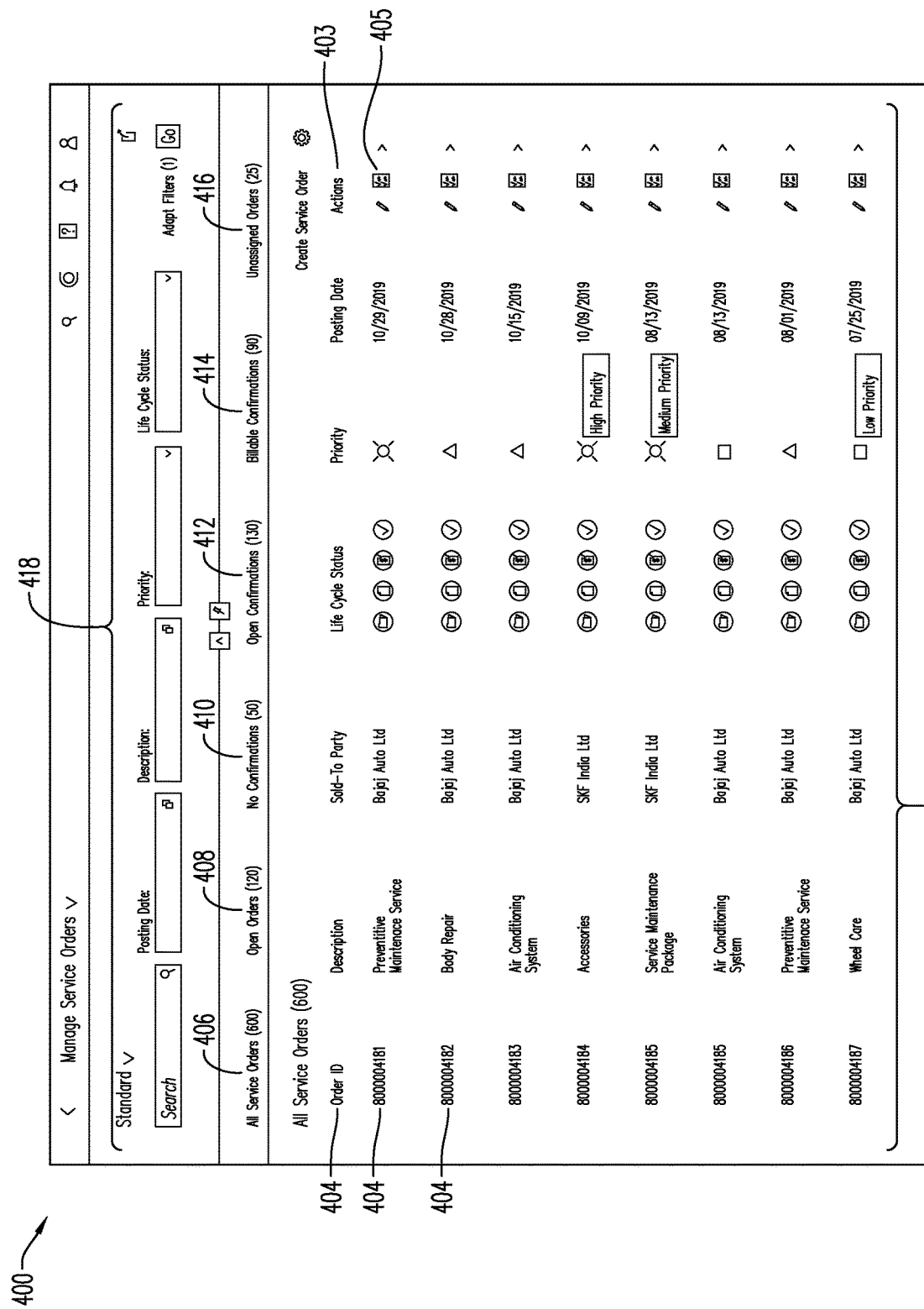
FIG. 4 is an outward view of a graphical interface according to some embodiments.

From the detail service order user interface 400, the service manager may view data 402 for all of the service orders by selecting the "all service orders" tab 406, as shown in the non-exhaustive example in FIG. 4. The service manager may also filter the data, by selecting the service order status 306 via any of an open orders tab 408, a no confirmations tab 410, an open confirmations tab 412, a billable confirmations tab 414 and an unassigned orders tab 416. It is noted that the unassigned orders tab 416 may display orders that have not yet been assigned to a particular service manager. The service manager may, in one or more embodiments, apply additional filters 418 to any of the data displayed after selection of a tab results in a more selective display. The additional filters 418 may include, but are not limited to, a user-entry search field, a posting date field, a description field, a priority field and a life-cycle status field. The additional filters 418 may include user-entry fields, drop-down menus, or any other suitable graphical control element. As used herein, the priority field may refer to priority of actioning on the order or with the customer, while the life cycle status field may refer to the stage of the transaction in terms of progress (e.g., Open—Service order created and no action is yet taken; In-Progress—some progression in the order in terms of information available; Released—Order is released for technician to work upon at site; and Completed—order is completed and eligible for billing).

In one or more embodiments, the service manager may want to receive additional data for one particular service order 404 or may want to execute an action for one particular service order 404. When the service manager wants to execute an action for the one particular service order, the service manager may select the action selector 405, as described above. When the service manager wants to receive additional data for one particular service order 404, the service manager may select (e.g., mouse-click) any position on the particular service order line. To that end, in S216, one of the displayed requests/service orders 404 is selected, and the selection is received. The selection may be received at a unification layer 908 of the request module 902.

Figure 5:
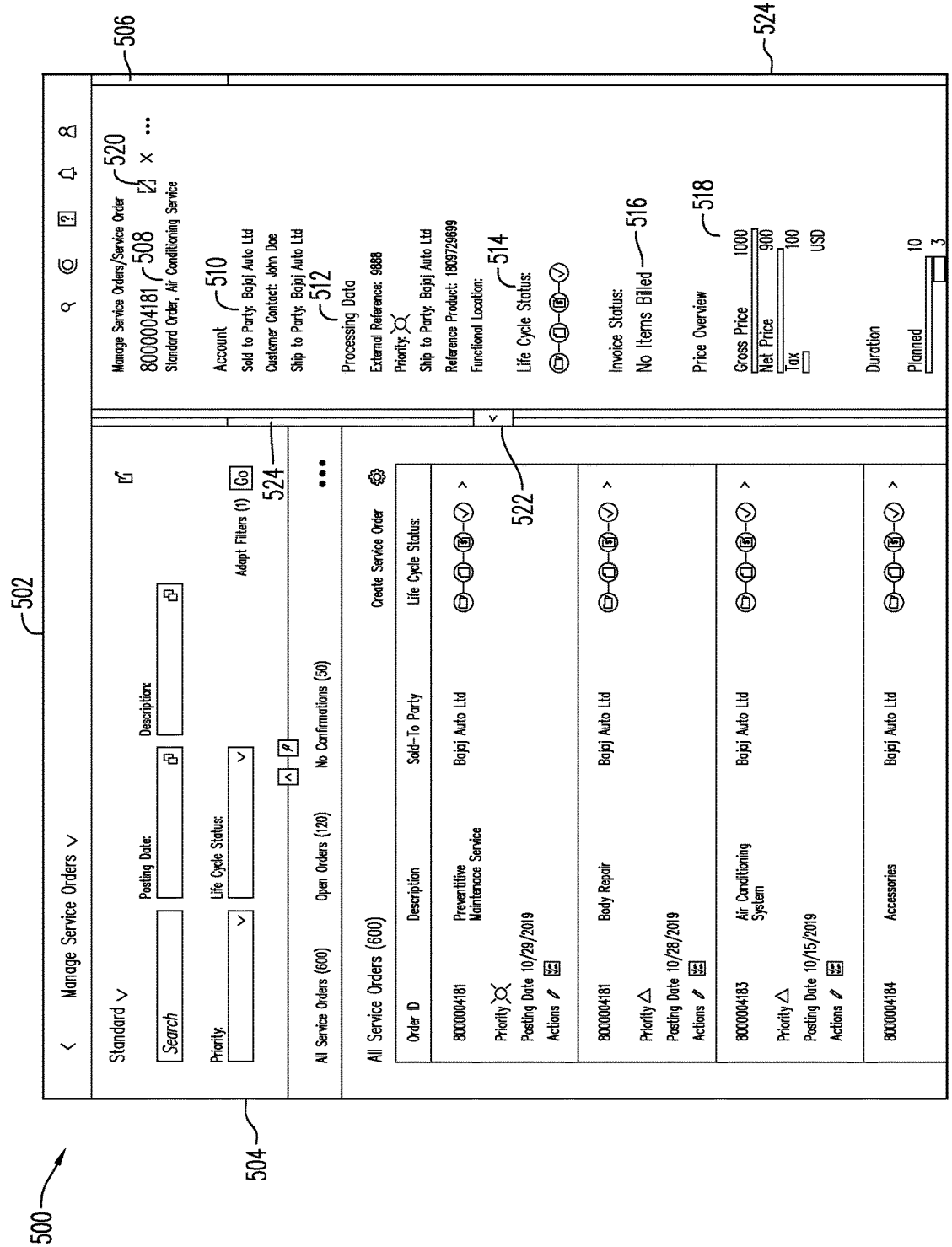
FIG. 5 is an outward view of a graphical interface according to some embodiments.
Figure 8:
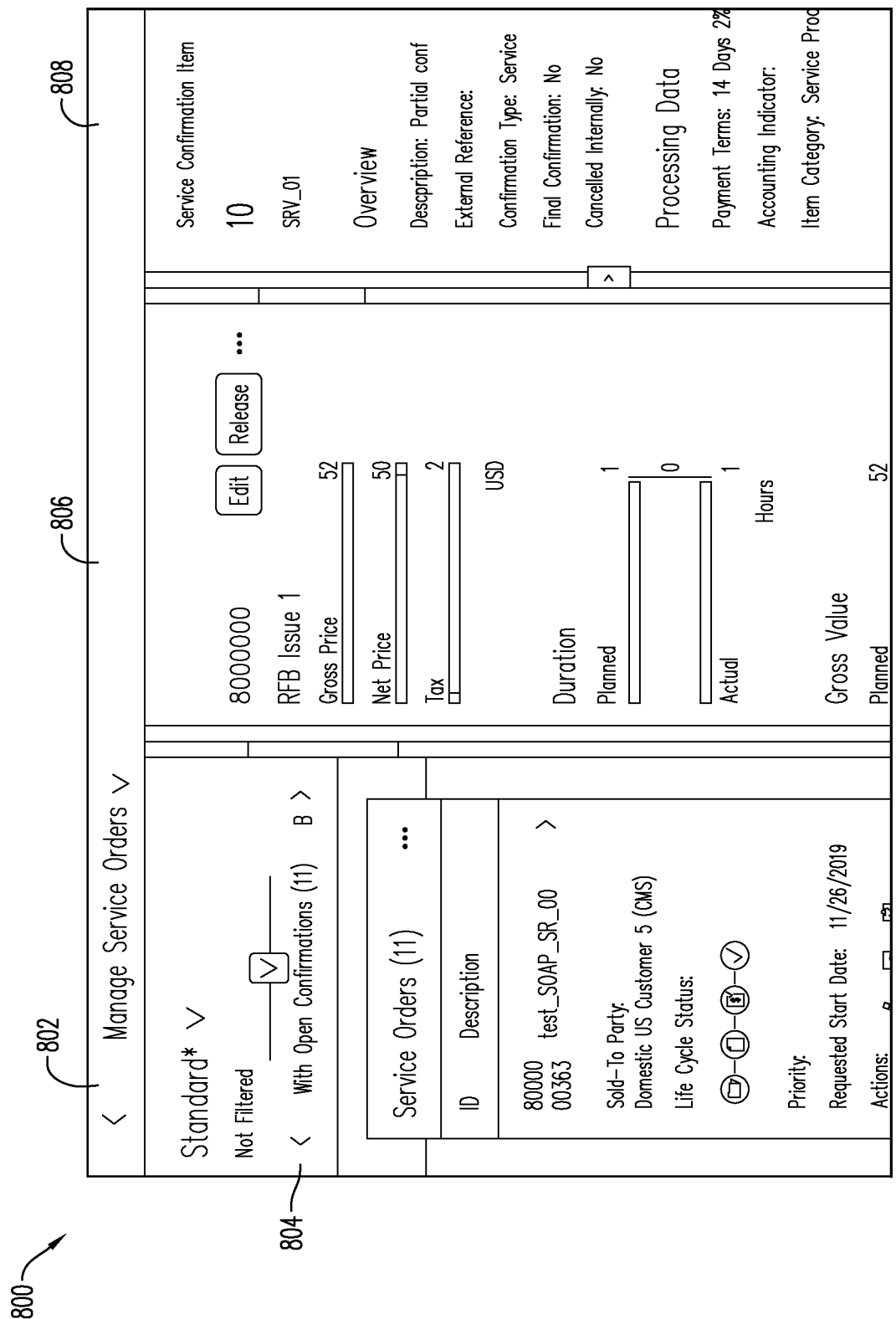
FIG. 8 is an outward view of a graphical interface according to some embodiments.

The unification layer 908 may then, in one or more embodiments, access at least one of the first application 904 and the second application 906 in S218 and retrieve data therefrom, where the first application 904 and the second application 906 are transactional applications, as described above. In one or more embodiments, the request module 902 generates a visualization 502, provided via a dual-section user interface 500 (FIG. 5). The dual-section user interface 500 may include a first section 504 and a second section 506. In the first section 504, the dual-section user interface 500 may display the data from FIG. 4, while the second section 506 may display additional data about the particular request/service order selected in S216. For example, the additional data may include, but is not limited to, the service order/request number 508, account data 510 (e.g., sold-to-party, customer contact, ship-to-party, etc.), processing data 512 (e.g., external reference number, priority level, equipment identifier, reference product, functional location etc.), a lifecycle status 514 and an invoice status 516. The inventors note that by providing the two sections, the service manager is able to easily view an overview of one or more service orders/requests, while at the same time view additional data for a selected service order/request. In one or more embodiments, the dual-section user interface 500 may include one or more scroll bars 524 to display additional content in that section.

The inventors note that conventionally a service manager needed to use various applications and toggle between them to get the appropriate information to be able to calculate the Key Performance Indicators (either manually or with an analysis application), which was a time consuming and error-prone task. To resolve this, in one or more embodiments, prior to the request module 902 generating the visualization 502, the request module 902 may generate one or more request indicators 518/Key Performance Indicators (KPI)s associated with the selected service order/request for display in the second section 506. In one or more embodiments, the KPI may indicate at least one of: a comparison of a planned metric vs. an actual metric and a progress of the resolution of the service order/request. In one or more embodiments, the request module 902 may calculate, using one or more KPI models (not shown), the request indicators 518 based on the data directly received from the first application 904 and the second application 906. As used herein, the phrases KPI and "request indicator" may be used interchangeably. In one or more embodiments, the request indicators/KPI may be presented in the visualization as at least one of a graph, chart, table or other suitable graphical element. The request indicator 508 may indicate, as non-exhaustive examples, planned cost versus actual cost, planned hours versus actual hours and gross planned value versus actual gross value. Although not shown, in one or more embodiments, the visualization in FIGS. 5, 6, 7 and 8 may also provide KPI information for the overall service order, not just individual aspects of an order. Other suitable KPIs may be generated.

In one or more embodiments, to view an expanded version of the second section 506, where the expanded version is the entire screen, the service manager may select a first expander selector 520. It is noted that the expanded version of the second section 506 may obviate the need for the scroll bar used in FIG. 5. By selecting the expander selector 520, an individual service order user interface 600 (FIG. 6) is provided for the user. In one or more embodiments, the individual service order user interface 600 may also include a progress indicator 601 that provides an indication of the progress of completion of the request/service order. In one or more embodiments, the individual service order user interface 600 may include further details for the particular service order. These further details may be arranged by a user-selectable tab, including but not limited to: Service Order Details tab 602, a price details tab 604, an organizational data tab 606, a parties involved tab 608, and an additional data tab 610. Selection of the user-selectable tab may provide further drilled down information. It is noted that each service order may include one or more items used to resolve the request, and these items may be listed in the service order details. As the non-exhaustive example shown in FIG. 6, selection of the Service Order Details tab 602 may display information about different item number(s), and for each item number: product id, description, item category, planned v actual quantity, planned v actual gross value and status.

In one or more embodiments, to view an expanded version of the second section 506 in FIG. 5 while maintaining the display of the first section 504 (e.g., information from FIG. 4), the service manager may select a second expander selector 522 in FIG. 5. Selection of the second expander selector 522 may result in the generation of the user interface 700 shown in FIG. 7. The user interface 700 may include an items selector 702 and a confirmation selector 704. Selection of the items selector 702 may generate a list with the Service Order items available which the service manager would see if directly accessing the service order application 904 (e.g., the planned elements to resolve the request). After the technician resolves the error/request, the technician may create a confirmation via the second application 906 (confirmation application), which may be accessed via selection of the confirmation selector 704.

Turning back to the process 200, selection of the confirmation selector 704 results in the request module 902 generating a visualization 802 displayed on a user interface 800 (FIG. 8) in S220. In one or more embodiments, the visualization 802 may be a flexible 3-column layout (although other suitable layouts may be used) that includes a first section 804, a second section 806 and a third section 808 in the single user interface 800 (unified UI). In one or more embodiments, the first section 804 and the second section 806 may be a list of selectable service orders and details for an individual service order, respectively, as shown in FIG. 5, and the third section 808 may be the order confirmation received from the second application 906 (confirmation application) for the particular order. It is noted that the third section 808 may, alternatively, be a Service Order item detail.

In one or more embodiments, to generate the visualization 802, the unification layer 908 of the request module 902 may retrieve data from the first application 904 and the second application 906, manipulate the retrieved data (e.g., perform calculations for KPIs), and display the data from both applications on the single visualization 802.

In one or more embodiments, the unification layer 908 may use the service order number/request number to access both the first application 904 and the second application 906 for data retrieval. Conventionally, the service order number was used to access the service order (first) application 904, and a confirmation number was used to access the confirmation (second) application 906. However, in one or more embodiments, the back end applications (e.g., first and second applications) may remain unchanged (e.g., the data is entered and stored the same way). To access the confirmation (second) application 906 using the service order number, in one or more embodiments, the unification layer 908 accesses a map 910 stored in the request module 902 or other storage 1030. The map 910 provides a link between every order number to a confirmation number of the confirmation (second) application 906.

Figure 9:
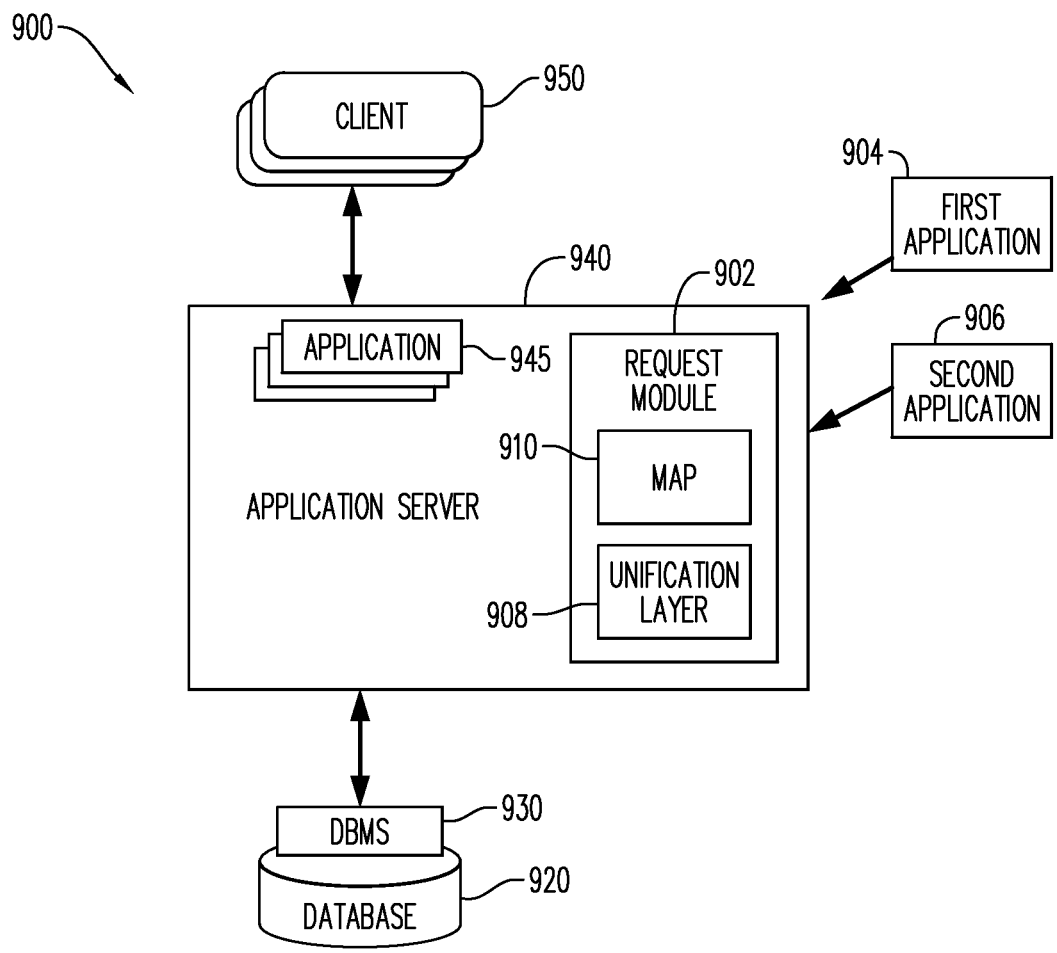
FIG. 9 is a block diagram system architecture according to some embodiments.

FIG. 9 is a block diagram of system architecture 900 according to some embodiments. Embodiments are not limited to architecture 900 or to a three-tier database architecture.

Architecture 900 includes a request module 902, a first application 904, a second application 906, a database 920, a database management system (DBMS) 930, an application server 940, application(s) 945, and clients 950. Applications 945 may comprise server-side executable program code (e.g., compiled code, scripts, etc.) executing within application server 940 to receive queries from clients 950 and provide results to clients 950 based on data of database 110, data of the first and second applications 904, 906 and the output of the request module 902. A client 950 may access the request module 902 executing within application server 940, to generate the user interfaces 400, 500, 600, 700 and 800 to trace the progress of resolving a service order/request.

Application server 940 provides any suitable interfaces through which the clients 950 may communicate with the request module 902 or applications 945 executing on application server 940. For example, application server 940 may include a HyperText Transfer Protocol (HTTP) interface supporting a transient request/response protocol over Transmission Control Protocol/Internet Protocol (TCP/IP), a Web Socket interface supporting non-transient full-duplex communications which implement the Web Socket protocol over a single TCP/IP connection, and/or an Open Data Protocol (OData) interface.

One or more applications 945 executing on server 940 may communicate with DBMS 930 using database management interfaces such as, but not limited to, Open Database Connectivity (ODBC) and Java Database Connectivity (JDBC) interfaces. These types of applications 945 may use Structured Query Language (SQL) to manage and query data stored in database 920.

DBMS 930 serves requests to retrieve and/or modify data of database 920, and also performs administrative and management functions. Such functions may include snapshot and backup management, indexing, optimization, garbage collection, and/or any other database functions that are or become known. DBMS 930 may also provide application logic, such as database procedures and/or calculations, according to some embodiments. This application logic may comprise scripts, functional libraries and/or compiled program code.

Application server 940 may be separated from, or closely integrated with, DBMS 930. A closely-integrated application server 940 may enable execution of server applications 945 completely on the database platform, without the need for an additional application server. For example, according to some embodiments, application server 940 provides a comprehensive set of embedded services which provide end-to-end support for Web-based applications. The services may include a lightweight web server, configurable support for OData, server-side JavaScript execution and access to SQL and SQLScript.

Application server 940 may provide application services (e.g., via functional libraries) which applications 945 may use to manage and query the data of database 920. The application services can be used to expose the database data model, with its tables, hierarchies, views and database procedures, to clients. In addition to exposing the data model, application server 940 may host system services such as a search service.

Database 920 may store data used by at least one of: applications 945 and the request module 902. For example, database 920 may store one or more tables accessed by the request module 902 during execution thereof.

Database 920 may comprise any query-responsive data source or sources that are or become known, including but not limited to a structured-query language (SQL) relational database management system. Database 920 may comprise a relational database, a multi-dimensional database, an eXtendable Markup Language (XML) document, or any other data storage system storing structured and/or unstructured data. The data of database 920 may be distributed among several relational databases, dimensional databases, and/or other data sources. Embodiments are not limited to any number or types of data sources.

In some embodiments, the data of database 920 may comprise one or more of conventional tabular data, row-based data, column-based data, and object-based data. Moreover, the data may be indexed and/or selectively replicated in an index to allow fast searching and retrieval thereof. Database 920 may support multi-tenancy to separately support multiple unrelated clients by providing multiple logical database systems which are programmatically isolated from one another.

Database 920 may implement an "in-memory" database, in which a full database is stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Client 950 may comprise one or more individuals or devices executing program code of a software application for presenting and/or generating user interfaces to allow interaction with application server 940. Presentation of a user interface as described herein may comprise any degree or type of rendering, depending on the type of user interface code generated by application server 940.

For example, a client 950 may execute a Web Browser to request and receive a Web page (e.g., in HTML format) from a website application 945 of application server 940 to provide the unified UI 800 via HTTP, HTTPS, and/or Web Socket, and may render and present the Web page according to known protocols. The client 950 may also or alternatively present user interfaces by executing a standalone executable file (e.g., an .exe file) or code (e.g., a JAVA applet) within a virtual machine.

Figure 10:
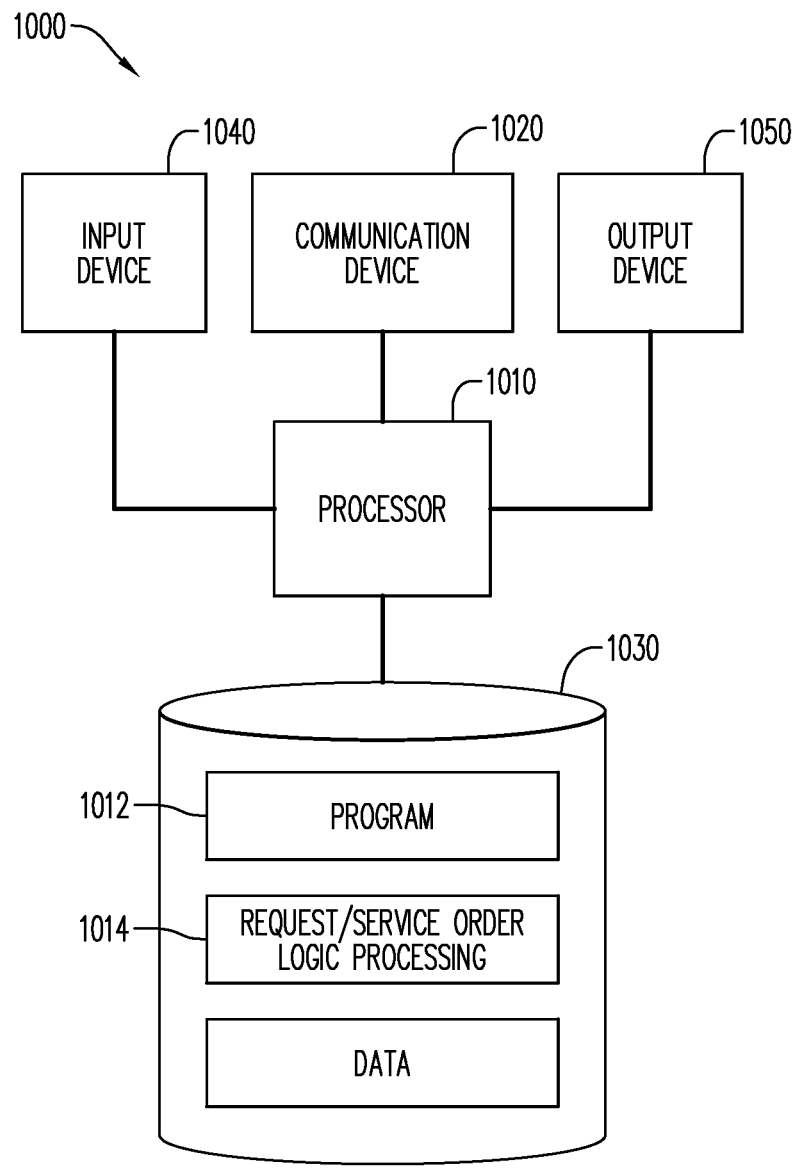
FIG. 10 is a block diagram of a system according to some embodiments.

FIG. 10 is a block diagram of apparatus 1000 according to some embodiments. Apparatus 1000 may comprise a general—or special-purpose computing apparatus and may execute program code to perform any of the functions described herein. Apparatus 1000 may comprise an implementation of one or more elements of system 900. Apparatus 1000 may include other unshown elements according to some embodiments.

Apparatus 1000 includes request processor 1010 operatively coupled to communication device 1020, data storage device 1030, one or more input devices 1040, one or more output devices 1050 and memory 1060. Communication device 1020 may facilitate communication with external devices, such as application server 940. Input device(s) 1040 may comprise, for example, a keyboard, a keypad, a mouse or other pointing device, a microphone, knob or a switch, an infra-red (IR) port, a docking station, and/or a touch screen. Input device(s) 1040 may be used, for example, to manipulate graphical user interfaces and to input information into apparatus 1000. Output device(s) 1050 may comprise, for example, a display (e.g., a display screen) a speaker, and/or a printer.

Data storage device/memory 1030 may comprise any device, including combinations of magnetic storage devices (e.g., magnetic tape, hard disk drives and flash memory), optical storage devices, Read Only Memory (ROM) devices, Random Access Memory (RAM) etc.

The storage device 1030 stores a program 1012 and/or request/service order platform logic 1014 for controlling the processor 1010. The processor 1010 performs instructions of the programs 1012, 1014, and thereby operates in accordance with any of the embodiments described herein, including but not limited to process 200.

The programs 1012, 1014 may be stored in a compressed, uncompiled and/or encrypted format. The programs 1012, 1014 may furthermore include other program elements, such as an operating system, a database management system, and/or device drivers used by the processor 1010 to interface with peripheral devices.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of computing devices in communication with one another via any number of other public and/or private networks. Two or more of such computing devices may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 900 may include a processor to execute program code such that the computing device operates as described herein.

All systems and processes discussed herein may be embodied in program code stored on one or more computer-readable non-transitory media. Such non-transitory media may include, for example, a fixed disk, a floppy disk, a CD-ROM, a DVD-ROM, a Flash drive, magnetic tape, and solid-state RAM or ROM storage units. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A computer-implemented method comprising:
providing a request processor and a request module, the request processor operative with the request module;
providing, via the request processor and the request module, a user interface, wherein the user interface displays an overview of at least one service order request and a completion status for each request;
receiving selection of one of the displayed requests at a unification layer, via the user interface, wherein the unification layer is provided by the request module;
accessing, by the request processor and the request module via the unification layer, a first application and a second application based on the received selection, wherein the first application is a service order application and the second application is a service confirmation application, wherein accessing the second application further comprises:
retrieving a service order number for the first application; and
accessing a map with the retrieved service order number, wherein the map includes a link between the service order number and the service confirmation application;

retrieving, by the request processor and the unification layer, data from the first application and the second application;

automatically generating, by the unification layer, at least one Key Performance Indicator (KPI) for the selected at least one service order request by manipulating data directly received from the first application and the second application;

and generating, by the request processor and the unification layer and based on the retrieved data, a single unified visualization including a first section and a second section displayed on the user interface, wherein the single unified visualization includes the at least one service order request and completion status for each request in the first section, the selected at least one service order request and the automatically calculated Key Performance Indicator (KPI) for the selected at least one service order request in the second section, and the user interface is provided by a user interface renderer and presented on a device.

2. The computer-implemented method of claim 1, wherein the visualization includes information from both the first application and the second application.

3. The computer-implemented method of claim 1, further comprising:

generating one or more data elements for the selected service order request; and displaying the one or more data elements in the visualization.

4. The computer-implemented method of claim 3, wherein the one or more data elements is at least one of a service order/request number, account data, processing data, lifecycle status, and invoice status.

5. The computer-implemented method of claim 1, wherein the first application and the second application trace execution of the service order request.

6. The computer-implemented method of claim 5, wherein the first application traces assignment for execution of the service order request.

7. The computer-implemented method of claim 6, wherein the second application traces implementation of the assignment.

8. The computer-implemented method of claim 1, wherein the KPI is presented in the visualization as at least one of a graph, a chart and a table.

9. A system comprising:

a display;

a request module including a unification layer;

a memory storing processor-executable steps: and a request processor operative with the request module to execute the processor-executable process steps to cause the system to:

provide a user interface, wherein the user interface displays an overview of at least one service order request and a completion status for each request, and the user interface is provided by a user interface renderer and is presented on a device;

receive selection of one of the displayed requests at the unification layer, via the user interface;

access, via the unification layer, at least one of a first application and a second application based on the received selection, wherein the first application and the second application trace execution of the request, and wherein access of the second application further comprises processor-executable process steps to:

retrieve a service order number for the first application; and access a map with the retrieved service order number, wherein the map includes a link between the service order number and the second application;

retrieve data from the first application and the second application;

automatically generate, by the unification layer, at least one Key Performance Indicator (KPI) for the selected service order request by manipulating data directly received from the first application and the second application;

and generate, based on the retrieved data, a single unified visualization including a first section and a second section and provide the visualization on the display, wherein the single unified visualization includes the at least one service order request and completion status for each request in the first section, and the selected at least one service order request and the automatically calculated Key Performance Indicator (KPI) for the selected at least one service order request in the second section.

10. The system of claim 9, wherein the visualization includes information from both the first application and the second application.

11. The system of claim 9, further comprising processor-executable process steps to cause the system to:

generate one or more data elements for the selected service order request; and display the one or more data elements in the visualization.

12. The system of claim 11, wherein the one or more data elements is at least one of a service order/request number, account data, processing data, lifecycle status, and invoice status.

13. The system of claim 9, wherein the first application traces assignment for execution of the service order request.

14. The system of claim 13, wherein the second application traces implementation of the assignment.

15. The system of claim 9, wherein the KPI is presented in the visualization as at least one of a graph, chart and table.

16. A non-transitory computer-readable medium storing program code, the program code executable by a computer system to cause the computer system to:

provide a user interface, wherein the user interface displays an overview of at least one service order request and a completion status for each request, and the user interface is provided by a user interface renderer and is presented on a device;

receive selection of one of the displayed requests at a unification layer, via the user interface;

access, via the unification layer, a first application and a second application based on the received selection, wherein the first application and the second application trace execution of the request, and wherein accessing the second application further comprises program code to:

retrieve a service order number for the first application; and access a map with the retrieved service order number, wherein the map includes a link between the service order number and the service confirmation application;

retrieve, by the unification layer, data from the first application and the second application;

automatically generate, by the unification layer, at least one Key Performance Indicator (KPI) for the selected at least one service order request by manipulating data directly received from the first application and the second application; and generate, based on the retrieved data, a single unified visualization including a first section and a second section and provide the visualization on a display, wherein the single unified visualization includes the at least one service order request and completion status for each request in the first section, and the selected at least one service order request and the automatically calculated Key Performance Indicator (KPI) for the selected at least one service order request in the second section.

17. The medium of claim 16, wherein the visualization includes information from both the first application and the second application.

18. The medium of claim 1, further comprising program code to cause the system to:
   generate one or more data elements for the selected service order request; and
   display the one or more data elements in the visualization.

19. The medium of claim 18, wherein the one or more data elements is at least one of a service order/request number, account data, processing data, lifecycle status, and invoice status.

20. The medium of claim 16, wherein the KPI is presented in the visualization as at least one of a graph, chart and table.

* * * * *